United States Patent [19]

Caussignac et al.

[11] Patent Number: 4,762,419
[45] Date of Patent: Aug. 9, 1988

[54] METHOD OF DETERMINING SURFACE RELIEF WITHOUT MAKING CONTACT THEREWITH

[75] Inventors: Jean-Marie Caussignac, Le Perreux Sur Marne; Gérard Morel, Courbevoie, both of France

[73] Assignee: Laboratoire Central Des Ponts Et Chaussees, Paris, France

[21] Appl. No.: 7,751

[22] Filed: Jan. 28, 1987

[30] Foreign Application Priority Data

Jan. 29, 1986 [FR] France .................. 86 01263

[51] Int. Cl.⁴ .............................. G01B 11/30
[52] U.S. Cl. ..................... 356/371; 356/376
[58] Field of Search ................. 356/371, 376

[56] References Cited

U.S. PATENT DOCUMENTS

| | | | |
|---|---|---|---|
| 3,663,107 | 5/1972 | Denis et al. | 356/371 |
| 4,017,188 | 4/1977 | Sawartari | 356/371 |
| 4,088,408 | 5/1978 | Burcher et al. | 356/371 |
| 4,548,504 | 10/1985 | Morander | 356/376 |

FOREIGN PATENT DOCUMENTS 3020044 12/1981 Fed. Rep. of Germany .
2454603 11/1980 France .
2022823 12/1979 United Kingdom .

OTHER PUBLICATIONS

Sawatari et al., *Optical Engineering*, vol. 18, No. 2, Mar.-Apr. 1979, pp. 222-225.
Journal of Optics (Paris) vol. 14, No. 1, Jan.-Feb. 1983, pp. 19-23.

Primary Examiner—F. L. Evans
Attorney, Agent, or Firm—Shenier & O'Connor

[57] ABSTRACT

A method of rapidly determining surface relief of an object or a structure without making contact therewith based on quantifying the degree to which the image of an illuminated point or small spot on the surface is defocussed. Said point or spot is illuminated by a source of electromagnetic radiation such as a laser, and the relief is determined in the form of a profile where the height of any point on the profile is represented by the ratio of the energy values of two beams derived by splitting a single beam reflected from the surface under investigation: one of the beams acting as a reference and the other of the beams being limited by the action of a diaphragm and constituting a measurement beam.

10 Claims, 3 Drawing Sheets

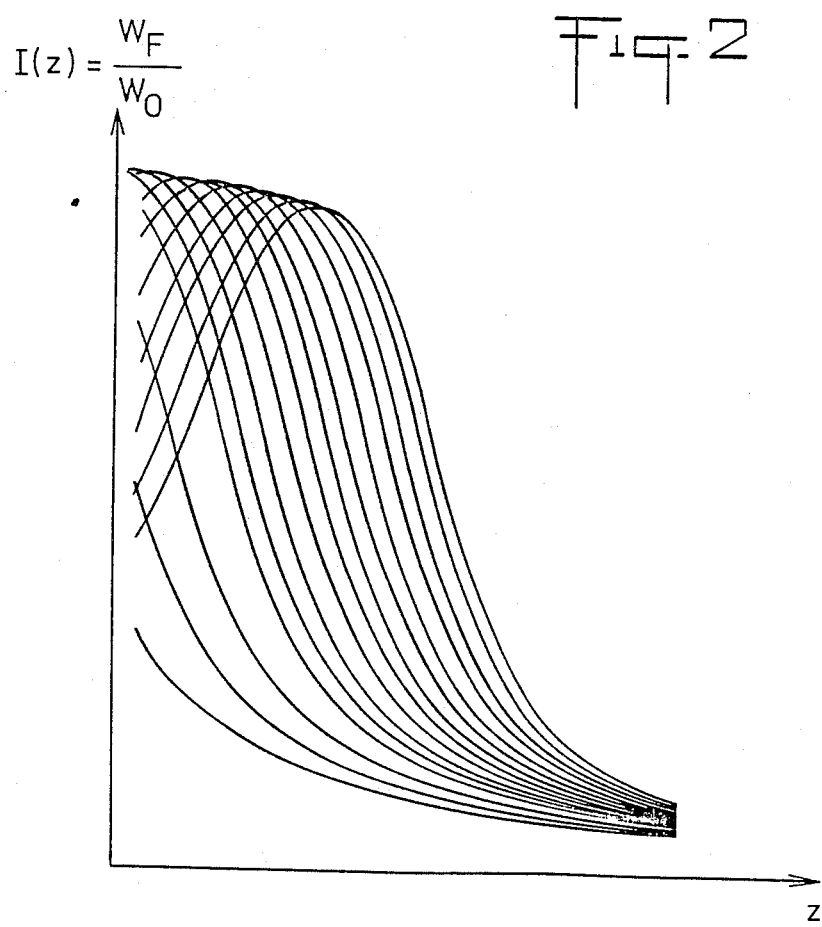

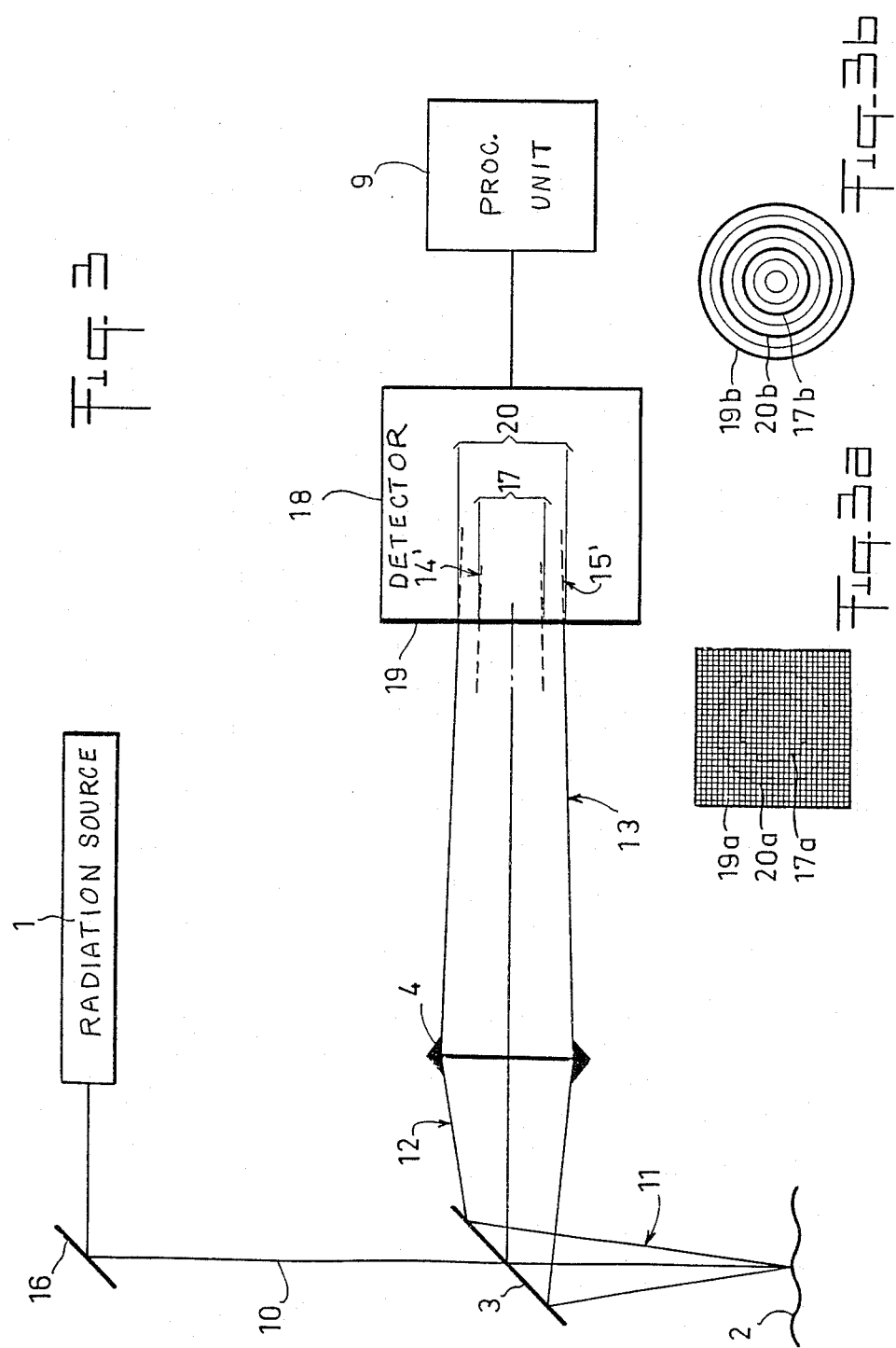

METHOD OF DETERMINING SURFACE RELIEF WITHOUT MAKING CONTACT THEREWITH

The present invention relates to a method of rapidly determining the relief of the surface of an object or a structure without making contact therewith. This method is based on detecting and measuring radiation returned from the surface under investigation.

BACKGROUND OF THE INVENTION

Methods of this type are already known in which a concentrated light beam is directed onto the surface under investigation and the beam reflected, or more precisely backscattered, by the surface is observed. Depending on the relief or the roughness of the surface, the reflected beam diverges to a greater or lesser extent, and a representation of the relief or surface state can be obtained by studying said divergence.

One such prior method is described in patent document SU-A-1 067 350 in which the surface under investigation is ilumimated at a certain angle and the radiation of the reflected beam is measured at various points in a plane perpendicular to the direction of specular reflection.

This measurement serves to determine the energy distribution of the reflected ray, and thus to obtain values or curves representative of the reflected radiation which, by comparison with values established at other points on the surface, or on a reference surface, can be used to determine the roughness or relief characteristics at the location of the surface under investigation.

It should be observed that a measurement performed using the above method is characteristic of one point on the surface under investigation, and that an examination of the entire surface requires repetitive measurements to be performed at all points on said surface, and that each measurement may require several operations to be performed. Alternatively, a certain area of the surface must be illuminated, in which case the resulting measurement is "averaged" over said area.

Further, measuring the relief of a circuit using this method is essentially comparative, and therefore the shape or profile of said relief is not accurately determined. Further, the result of the measurement is subject to variations in the radiation emitted by the source, which variations may occur while a measurement is taking place or between two consecutive measurements.

U.S. Pat. No. 4,017,188 describes a method in which the surface under investigation is illuminated with a light beam, in which the beam backscattered by said surface is focussed by means of a lens, in which the beam from said lens is split into a measuring beam which is passed through a diaphrahm and which possesses a total energy of value Wf after passing through the diaphragm, and a reference beam which is not passed through a diaphragm and which possesses a total energy of value Wo. The incident beam and the lens are displaced relative to the surface under investigation at a constant average distance from said surface, and throughout this displacement the energies of the measurement beam and the reference beam are continuously measured, and for each measurement point the ratio Wf/Wo of their respective values is determined, with variation in said ratio during the above-described displacement being representative of the relief of the surface under investigation. According to said US document, the diaphragm is constituted by a slot, thereby limiting the application of the method to particular types of relief. Also, and above all, the system described places the lens between the light source and the surface under investigation. The resulting double defocussing effect leads to a small light spot and consequently to the measured area being considered reduced: any defocussing of the impact of the light beam on the surface under investigation gives rise to a corresponding limit in the spatial resolution in a direction parallel to said surface.

The object of the present invention is to provide a method of determining or measuring the relief of a surface, which method is capable of mitigating the above-mentioned drawbacks.

SUMMARY OF THE INVENTION

According to the method of the invention, the surface under investigation is illuminated by an incident beam of electromagnetic waves, said beam being narrow, concentrated, and of known energy distribution which must be circularly symmetrical; then, in conventional mannner, the beam backscattered from said surface is focussed by means of an objective lens; the beam delivered by said objective lens is split into two beams, one of which beams is a "measurement" beam, is limited by diaphragm action, and possesses a total energy of value Wf after being subjected to said diaphragm action, while the other beam is a "reference" beam, is not subjected to diaphragm action, and has a total energy of value Wo; the incident beam and the objective lens are displaced relative to the surface under investigation parallel thereto and at a constant average distance therefrom; the energies of the measurement and of the reference beams are permanently measured during said displacement, and for each measurement point the ratio Wf/Wo of their respective values in determined, with variation in said ratio during the above-described displacement being representative of the relief of the surface under investigation.

Throughout this description, the term "split", as applied to a beam, covers obtaining at least two beams representative of an inlet beam, even where such splitting is virtual and without it being necessary for "physical" separation of two beams to be obtained; similarly, the term "diaphragm" is used to designate any means suitable for obtaining only a portion of a beam with its section being limited by a given surface.

Thus, in known manner, by virtue of its relief the surface under investigation backscatters the incident beam. The back-scattered beam is focussed by an objective lens, and if the real optical distance between the objective lens and the point of the surface irradiated by the incident beam varies, then the real optical distance between the objective lens and the image of said point also varies, as does the solid angle of the converging beam coming from the objective lens. As a result, a diaphragm placed on the measurement beam at a fixed distance from the lens and away from the image plane of said beam limits said beam to a greater or lesser extent depending on the variation in the real optical distance separating the objective lens from the surface under investigation.

Consequently, the energy of the measurement beam is "modulated" by the diaphragm, whereas the energy of the reference beam is fully transmitted since it is not limited by a diaphragm.

It can thus be seen that the result of the meaurement, which is the ratio Wf/Wo of the respective energy values from the measurement beam and the reference beam obtained by splitting a single beam is independent of possible energy variations in said incident beam, and thus of possible fluctuations in the source.

A considerable advantage of the method is that the incident beam is a narrow and concentrated beam (i.e. it is substantially cylindrical), but there is no need for it to be a sharp point, thereby considerably facilitating implementation of the method. Defocussing takes place only once, and the size of the light spot is constant with the energy distribution therein being circularly symmetrical.

Further, it may also be observed that while remaining within reasonable limits for implementing the method, the method can still be applied to measuring relief over a wide granulometric range, provided certain parameters determined for implementing the method are suitably adapted.

Finally, the results of a measurement performed in accordance with the method of the present invention is a value representative of the real optical distance between the objective lens and the current point on the surface under investigation, and is not a comparative value with reference to a reference surface. This is particularly advantageous, since it then becomes possible to represent the profile of the relief of the surface under investigation practically directly.

An advantageous disposition of the method in accordance with the invention consists in directing the incident beam orthogonally to the surface under investigation through an objective lens enabling the backscattered beam to be observed, likewise orthogonally to said surface. This disposition has the great advantage of avoiding the phenomenon of projected shadows which may occur when illuminating and observing obliquely relative to the surface, and thereby eliminate a considerable portion of measurement errors.

The present invention may be implemented by means of a device for measuring the surface relief on an object or a structure without making direct contact with said surface, the device comprising:

a source capable of emitting a narrow and concentrated beam of electromagnetic waves of known circularly symmetrical energy distribution, which beam is directed to the surface under investigation and is backscattered therefrom;

an objective lens which focusses the backscattered beam;

a splitting device placed downstream from the objective lens to split the beam from said objective lens into two beams, namely a measurement beam, amd a reference beam;

a diaphragm placed on the measurement beam at, or downstream from, the splitting device and in a plane which always remains different from the plane of the image of the surface under investigation provided by the objective lens, thereby permanently limiting said measurement beam;

means for displacing the incident beam and the objective lens relative to the surface under investigation, in parallel therewith and at a constant average distance therefrom;

measurement means placed on the measurement beam and on the reference beam in order to permanently determine the respective values Wf/Wo of the energies of said measurement beam and of said reference beam during displacement of the incident beam and the objective lens relative to the surface under investigation; and;

means for computing the ratio Wf/Wo of the respective energy values of the measurement beam and of the reference beam for each measurement point.

In a particularly advantageous embodiment of the invention, the beam from the objective lens is received on the sensitive surface of a detector constituted so as to be able to accurately delimit various zones when transforming radiation into an electrical signal, with the energy Wf being measured as received on a first zone corresponding to the entire cross-section of the reference beam, and with the energy Wo being measured as received on a smaller zone corresponding to the cross-section of the beam that has been subjected to the action of a diaphragm.

Advantageously, the smaller zone is a substantially circular or annular zone included in the first zone.

BRIEF DESCRIPTION OF THE DRAWINGS

An implementation of the method is described by way of example with reference to the accompanying drawings, in which:

FIG. 2 is a graph showing the variation in the ratio Wf/Wo as a function of the optical distance between the objective lens and the surface under investigation, for a plurality of of diaphragm to objective lens distances;

FIG. 3 is a diagram of a preferred embodiment of a device for implementing the invention; and FIGS. 3A and 3B are diagrammatic front views of detectors suitable for use in the FIG. 3 implementation, FIG. 3A showing a matrix detector and FIG. 3B showing an annular detector.

DESCRIPTION OF PREFERRED IMPLEMENTATIONS

Figure 1:
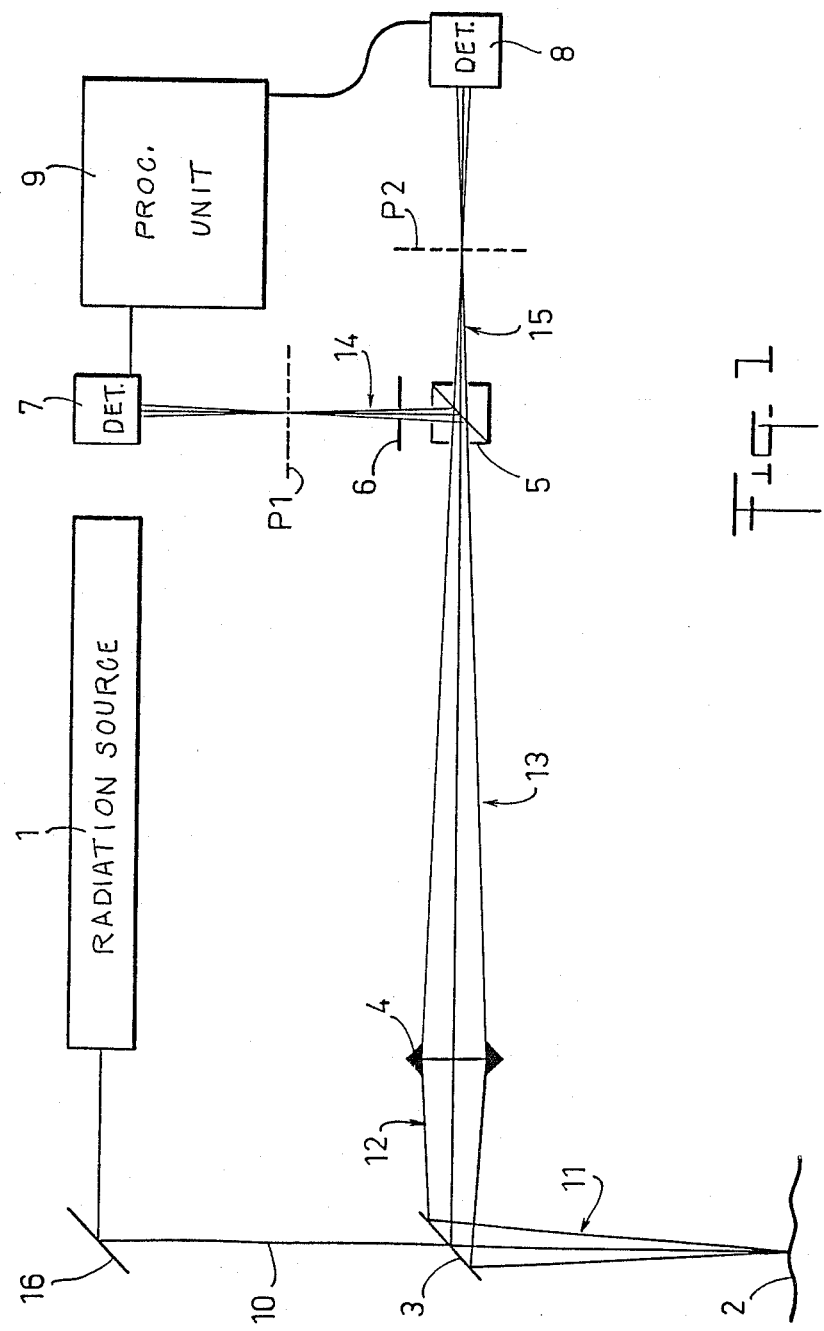
FIG. 1 is a diagram of a device implementing the method of the invention.

In FIG. 1, a source of radiation 1 (which in this case is a laser operating in the visible region of the spectrum, but which could be some other source of electromagnetic radiation, which need not necessarily be visible) emits a beam 10 which, for practical reasons of implementing the device in reasonable space, is reflected through 90° by a mirror 16, which has no other effects on the characteristics of the beam.

The incident beam 10 is directed onto the surface under investigation 2, and is reflected, and more precisely backscattered therefrom as a diverging beam 11, 12. The diverging beam 11, 12 is then focussed by an objective lens 4 into a converging beam 13.

In the diagram of FIG. 1, there is a reflector 3 for the backscattered beam 11, and the beam 12 is at an angle to the beam 11. Although it is possible, in accordance with the invention, to direct the incident beam 10 and to observe the backscattered beam obliquely relative to the surface 2, it is undeniably advantageous to be able to direct the incident beam 10 and to observe the backscattered beam 11 orthogonally to the surface 2. This can be done by using a reflector 3 which is placed on the path of said beam, preferably at 45° relative to the direction of the incident beam 10 and constituted either by a semi-transparent plate, or by a mirror having an orifice through which the narrow incident beam 10 can pass, or else by some other similar device.

The convering beam 13 coming from the objective lens is directed to a beam splitter, which in FIG. 1 is constituted by a cube 5. The beam 13 is split by said beam splitter into two beams 14 and 15 which are preferably orthogonal.

The beam 15 is referred to as the "reference" beam and is directed onto a detector 8 which measures the energy of said reference beam 15.

The beam 14 which is referred to as a "measurement" beam passes through a diaphragm 6 prior to be being directed onto a measuring detector 7 which measures the energy of said beam 14 after it has passed through the diaphragm.

The detectors 7 and 8 are devices for measuring the energy of the radiation they receive by transforming it into an electrical signal proportional to the received energy. The signals generated by the detectors 7 and 8 are then processed in an electronic signal processing unit 9.

In order to perform a measurement with the device shown diagrammatically in FIG. 1, the assembly constituted by the source 1, the mirror 16, the semi-transparent plate 3, the objective lens 4, the beam splitter 5, the diaphragm 6, and the detectors 7 and 8, is moved relative to the surface under investigation 2.

This motion takes place parallel to the surface under investigation 2 and at a constant average distance therefrom, i.e. parallel to the surface envelope of said surface 2, with the variations in the relief of said surface being negligible relative to the dimensions of the device as a whole.

Thus, during said relative displacement of the device relative to the surface 2, variations occur in the real optical distance Z between the objective lens 4 and the illuminated point on the surface under investigation 2. As the distance Z varies, so do the positions of the image planes P1 and P2 downstream from the beam splitter, thereby varying the diameter of the beam 14 where it meets the diaphragm 6. Thus, as the distance Z varies, so does the energy in the measurement beam 14 passing through the diaphragm 6.

Thus, when the incident beam 10 illuminates a prominent point on the surface 2, the distance Z will be reduced, thereby moving the image plane P1 away from the objective lens 4 and thus increasing the diameter of the beam 14 immediately upstream from the diagram 6. As a result, the diaphragm 6 passes a relatively smaller proportion of the energy in the beam.

This energy Wf is measured by the measurement detector 7. At the same time, the energy Wo in the reference beam 15 (i.e. a beam which does not pass through a diaphragm) is measured by the reference detector 8, and remains exactly proportional to the energy of the backscattered beam 11, while the energy measured by the measurement detector 7 varies, by virtue of "modulation" by the diaphragm 6.

In order to ensure that the measurement is accurate, both of the detectors 7 and 8 must have sufficient sensitive surface area to integrate the totality of the radiation they receive, regardless of the positions of the image planes P1 and P2. It is also necessary for the diaphragm 6 to remain permanently away from any position which the image plane P1 can take up, and for its diameter to be less than or at least not greater than the diameter of the beam 14 immediately upstream from the diaphragm 6.

Naturally the FIG. 1 implementation in which the image planes P1 and P2 are located downstream from the beam splitter 5 is more advantageous with regard to the above-specified requirements, since they enable the sensitive surfaces of the detectors to be kept suitably small. However, it would not be impossible to have the image planes P1 and P2 situated upstream from the beam splitter 5 (in which case they would be constituted by a single image plane), thereby giving rise to beams 14 and 15 which are divergent, and thus requiring detectors of greater size.

FIG. 3 is a diagram of a device constituting a particularly advantageous implementation of the invention in which the beam splitter and the diaphragm are located in the same plane as the sensitive surface of the detector of the measuring means.

In this case, the reference beam 15' shown in dashed lines in FIG. 3 is constituted by the entire beam 13 coming from the objective lens whereas the measurement beam 14' is constituted by a portion thereof, likewise shown by dashed lines and limited to a circular section 17 which is coaxial with said beam.

The beam 13 from the objective lens is thus directly split by the signal processing means connected to the detector 18. The sensitive surface 19 of the detector is constituted so as to be able to accurately delimit different zones when transforming radiation into an electrical signal, and is in any case larger than the cross-section 20 of the entire beam 13.

It will readily be understood that the measurement beam is not "physically" limited by a diaphragm, but that the required limitation is performed by the sensitive surface, by choosing a zone corresponding to the section 17 delimiting the measurement beam.

If the characteristics of the detector 18 are capable of so doing, it is equally possible to select a zone 17 delimiting the measurement beam which is circular or which is annular, providing only that the beam 13 illuminates at least the entire area 17 and that said measurement beam area is coaxial with the beam 13 coming from the objective lens.

The sensitive surface 19 may be constituted by a matrix type cell 19a (see FIG. 3A) or by an annular type cell 19b (see FIG. 3B) with the resolution being as fine as possible in either case (in this respect the drawings are highly diagrammatic). For example, the sensitive surface may be constituted by a solid state camera making use of charge transfer detectors.

When the sensitive surface of the detector is used to perform beam splitting and beam limitation, two energy values are obtained: a value Wf corresponding to the measurement beam as limited by the zone 17a, 17b, and a value Wo corresponding to the reference beam, and thus to the entire beam 13 coming from the objective lens as received in the zone 20a, 20b and comprising the sum of the energy Wf plus the radiant energy captured by the detector outside the area 17a, 17b.

The electrical signals emitted by the detectors are injected in the signal processing device 9 which obtains the ratio by analog division in real time and for each point. The resulting signal I(Z) is a function of the distance Z between the objective lens 4 and the surface under investigation 2, where I(Z)=Wf/Wo.

In theory, and as confirmed by experiment, variation in the ratio Wf/Wo=I (Z) at any given point as a function of the surface to objective lens distance Z is represented by a non-symmetrical bell-shaped curve (see FIG. 2). The two sides of the curve represent upstream and downstream positions of the image plane P1 relative to the diaphragm, with the peak central portion of the curve being obtained on coincidence.

It can be easily be seen that the useful operating region for the device lies in the quasi-linear portion of the curve corresponding to maximum variation in the ratio Wf and Wo as the real optical distance Z between the objective lens 6 and the surface 2 varies.

This useful working region can be adapted to the desired performance and measuring range by modifying one or more of the parameters of the device. These parameters that may be usefully modified are as follows:

1. the diameter of the objective lens;
2. the local length of the objective lens;
3. the diameter of the "modulating" diaphragm;
4. the diaphragm to objective lens distance; and
5. the "average distance" between the surface and the objective lens.

The set of curves shown in FIG. 2 correspond to variation in parameter No. 4 (the diaphragm-to-objectivelens distance) while the other parameters 1, 2, 3, and 5 remain fixed.

The non-linearity of I(Z) as a function of distance Z may require corrections to be performed when processing the signal I(Z). These corrections can be performed by the signal processing device 9. The device 9 then converts the analog signal I(Z) into a digital signal which can be used to determine the characteristics of the real profiles in order to deduce parameters concerning the roughness of the surface.

Variations in I(Z) as a function of ambient light, i.e. interference, can also be corrected. This may be done by measuring the energy Wi received on an individual measuring sensor lying outside the zone 20a, 20b (e.g. a corner cell in the matrix detector 19a or the outermost annular cell in the annular detector 19b), and by putting Nf and No as the numbers of cells in the zones 17 and 20 respectively, with the corrected value of I(Z) being given by:

$$I'(Z) = (Wf - NfWi)/(Wo - NoWi)$$

Since the parameters of the device can be modified, the device is capable of being used in various applications. Scanning in two orthogonal directions can provide a three-dimensional reconstruction of the relief on a surface. Depending on the geometry chosen, this may be macro-roughness, micro-roughness, lengthwise profile, or height measurement, and in each case without direct contact with the surface.

The method is applicable to determining the roughness or relief of a road surface, but this application is by no means the only possible application thereof.

We claim:

1. A method of determining the measuring relief on the surface of an object or a structure without making direct contact with said surface, wherein:

the surface under investigation is illuminated by a beam of electromagnetic waves;

an objective lens is used to focus the beam as backscattered from said surface;

the beam coming from said objective lens is split into a measurement beam and a reference beam, said measurement beam being subjected to the action of a diaphragm and having a total energy of value Wf after being subjected to the action of said diaphragm, and the reference beam possessing a total energy of value Wo and not being subjected to the action of a diaphragm;

the incident beam and the objective lens are displaced relative to the surface under investigation parallel thereto and at a constant average distance therefrom;

the energies of the measurement beam and the reference beam are continuously measured during said displacement, and for each measurement point the ratio of their respective values Wf/Wo is determined, with the variation in said ratio during said displacement being representative of the relief in the surface under investigation;

the incident beam used to illuminate the surface is narrow, concentrated, and of known circularly symmetrical energy distribution, and said diaphragm being circularly symmetrical.

2. A method according to claim 1, wherein the incident beam is directed orthogonally to the surface under investigation through a device enabling the backscattered beam from said surface to be observed likewise orthogonallly to said surface.

3. A method according to claim 1, wherein the objective lens is placed at an average optical distance from the surface under investigation such that variation in the ratio Wf/Wo is at a maximum when the real optical distance between said objective lens and said surface under investigation is varying.

4. A method according to claim 1, wherein the reference beam is constituted by the entire beam coming from the objective lens, and wherein the measurement beam is constituted by a portion of said beam from the objective lens, with the cross-section of said portion being limited to a circular or annular area which is coaxial with said entire beam from the objective lens.

5. A method according to claim 2, wherein said device enabling both illumination and observation of said surface to be orthogonal thereto is constituted by a semi-transparent plate preferably oriented at an angle of 45° to the direction of the incident beam.

6. A method according to claim 2, wherein said device enabling both illumination and observation of said surface to be orthogonal thereto is constituted by a mirror having a hole therethrough preferably oriented at an angle of 45° to the direction of the incident beam.

7. A method according to claim 1, wherein the incident beam is a laser beam.

8. A method according to claim 1, wherein the beam coming from the objective lens is split by a beam splitter cube, separating said beam into two orthogonal beams.

9. A method according to claim 1, wherein the beam coming from the objective lens is received on the sensitive surface of a detector constituted in such a manner as to be able to accurately delimit different areas when transforming radiation into an electrical signal, said detector being used firstly to measure the energy Wf received on a first region corresponding to the entire cross-section of the reference beam, and secondly to measure the energy Wo received on a smaller region corresponding to the cross-section of the beam as subjected to the action of a diaphragm.

10. A method according to claim 9, wherein the smaller region is a substantially circular or annular region included within the first region.

* * * * *

UNITED STATES PATENT AND TRADEMARK OFFICE
CERTIFICATE OF CORRECTION

PATENT NO. : 4,762,419
DATED : August 9, 1988
INVENTOR(S) : Caussignac et al

It is certified that error appears in the above-identified patent and that said Letters Patent are hereby corrected as shown below:

In the Claims:

Claim 1, line 1, change "the" to --or--.

Signed and Sealed this

Twenty-ninth Day of November, 1988

Attest:

DONALD J. QUIGG

Attesting Officer

Commissioner of Patents and Trademarks